US010090552B2

United States Patent
Matter et al.

(10) Patent No.: US 10,090,552 B2
(45) Date of Patent: Oct. 2, 2018

(54) LIQUID FUEL BATTERY

(71) Applicant: pH Matter, LLC, Columbus, OH (US)

(72) Inventors: Paul H. Matter, Columbus, OH (US);
Christopher T. Holt, Bexley, OH (US);
Michael G. Beachy, Gahanna, OH (US)

(73) Assignee: pH Matter, LLC, Columbus, OH (US)

( * ) Notice: Subject to any disclaimer, the term of this patent is extended or adjusted under 35 U.S.C. 154(b) by 999 days.

(21) Appl. No.: 14/322,164

(22) Filed: Jul. 2, 2014

(65) Prior Publication Data

US 2015/0010845 A1    Jan. 8, 2015

Related U.S. Application Data

(60) Provisional application No. 61/842,773, filed on Jul. 3, 2013.

(51) Int. Cl.
| | |
|---|---|
| *H01M 8/2455* | (2016.01) |
| *H01M 8/04082* | (2016.01) |
| *H01M 8/1009* | (2016.01) |
| *H01M 8/2475* | (2016.01) |
| *H01M 4/96* | (2006.01) |

(52) U.S. Cl.
CPC ........... *H01M 8/2455* (2013.01); *H01M 4/96* (2013.01); *H01M 8/04201* (2013.01); *H01M 8/1009* (2013.01); *H01M 8/2475* (2013.01)

(58) Field of Classification Search
None
See application file for complete search history.

(56) References Cited

U.S. PATENT DOCUMENTS

| | | | | | |
|---|---|---|---|---|---|
| 4,562,123 | A | * | 12/1985 | Shimizu | H01M 8/04186 429/101 |
| 6,054,228 | A | * | 4/2000 | Cisar | C25B 9/066 429/443 |
| 6,610,433 | B1 | * | 8/2003 | Herdeg | H01M 8/04208 429/443 |
| 6,924,054 | B2 | * | 8/2005 | Prasad | B01J 7/02 220/4.12 |
| 9,780,394 | B2 | * | 10/2017 | Friesen | H01M 8/04089 |

(Continued)

OTHER PUBLICATIONS

Biddinger, Elizabeth J., and Umit S. Ozkan. "Methanol Tolerance of CNx Oxygen Reduction Catalysts". Topics in Catalysis, vol. 46, No. 3-4, 2007, pp. 339-348. Springer Nature, doi:10.1007/s11244-007-9014-7.*

*Primary Examiner* — Maria J Laios
*Assistant Examiner* — Robert Scott Carrico
(74) *Attorney, Agent, or Firm* — Michael J. Gallagher; Luper Neidenthal & Logan (57) ABSTRACT

A liquid fuel battery is described, having a vented case, an internal fuel chamber, and a plurality of substantially planar vertically stacked battery elements having separated fuel-sides and air sides. Such sides are separated by a series of anodic and cathodic seals. In one embodiment, a cathode contains doped carbon nanofibers and may be treated with polytetrafluoroethylene or another hydrophobic material. An anode current collector and/or cathode current collector may contain perforated metal, including metal mesh. Battery elements may be U-shaped to maximize the efficiency of the air-fuel interaction. The cathode is active for oxygen reduction and inactive for fuel oxidation.

15 Claims, 10 Drawing Sheets

(56) References Cited

U.S. PATENT DOCUMENTS

| | | | |
|---|---|---|---|
| 2002/0029820 A1* | 3/2002 | Ovshinsky | B22F 9/008 |
| | | | 141/110 |
| 2005/0202291 A1* | 9/2005 | Schweizer | H01M 8/04186 |
| | | | 429/434 |
| 2006/0040146 A1* | 2/2006 | Yamaguchi | H01M 8/04194 |
| | | | 429/448 |
| 2006/0170391 A1* | 8/2006 | Lam | H01M 8/00 |
| | | | 320/101 |
| 2007/0092770 A1* | 4/2007 | Obata | H01M 8/04194 |
| | | | 429/432 |
| 2009/0191441 A1* | 7/2009 | Yoshida | H01M 8/04186 |
| | | | 429/515 |

* cited by examiner

Fig. 11

LIQUID FUEL BATTERY

CROSS-REFERENCE TO RELATED APPLICATIONS

This application claims the benefit of U.S. Provisional Patent Application 61/842,773, filed Jul. 3, 2013.

STATEMENT REGARDING FEDERALLY SPONSORED RESEARCH OR DEVELOPMENT

This invention was made with government support under National Science Foundation Contract Number IIP-1330169. The government may have certain rights in the invention.

TECHNICAL FIELD

The present disclosure relates generally to a liquid fuel battery, in particular to a battery utilizing compact stacked electrodes and having a cathode that is resistant to fuel oxidation.

BACKGROUND OF THE INVENTION

There are numerous types of batteries with various advantages and disadvantages that depend on the battery application. Primary batteries, such as conventional alkaline batteries and primary metal-air batteries, operate through a single discharge cycle before the anode is exhausted and the battery must be replaced. Secondary batteries, such as lithium ion batteries, can be recharged and used through repeated charge/discharge cycles; however, the time period required for recharging the battery is often unacceptable in applications where a source of electricity is not readily available.

Fuel cells are similar to batteries, but can utilize hydrogen, methanol, formic acid, or other hydrocarbons as a fuel for the anode. Consequently, the fuel can be replenished indefinitely, eliminating the need for a long recharge step. However, wide-spread adoption of fuel cells has been hindered by the high cost of components required for operation. Typically, the air cathodes of a fuel cell utilize a high-cost platinum-based catalyst. Additionally, ionic membranes are required to separate the fuel and air, and these exotic membranes increase the cost and complexity of the fuel cell, its operation, and the manufacturability.

In addition to the high cost, fuel cell commercialization has been limited by the availability of hydrogen, and the difficulties with distributing and storing hydrogen. Direct methanol fuel cells (DMFCs) can operate using methanol and water as the fuel, providing a solution to the issues with hydrogen fuel. However, methanol can cross through the ionic electrolyte membrane, in a process known as "methanol crossover," and directly oxidizes on the cathode, lowering the fuel cell voltage and power. Consequently, the concentration of methanol used as a fuel must be limited with conventional DMFCs to prevent methanol crossover. In turn, using less concentrated methanol solutions lowers the energy density of the fuel.

SUMMARY OF THE INVENTION

The disclosed invention relates to a liquid fuel battery, including a vented case containing a refillable fuel chamber and at least one, and often more, substantially planar vertically stacked battery elements. The vertical stacking orientation provides optimal packing efficiency that is advantageous for small low-power devices. Each battery element has a fuel-side section an air-side section. These battery elements include an anode collector assembly having an anode current collector in fluid communication with the fuel chamber on the fuel-side section and sealed from an ambient atmosphere on the air-side section by an anodic air-side seal. The battery elements also include an anode in fluid communication with the fuel chamber on the fuel-side section and sealed from an ambient atmosphere on the air-side section by an anodic air-side seal. An electrically nonconductive separator separates the anode and a cathode. A porous-to-air cathode is in fluid communication with an ambient atmosphere on the air-side section and a cathode collector assembly has a cathode current collector in fluid communication with an ambient atmosphere on the air-side section and sealed from the fuel chamber on the fuel-side section by a cathodic fuel-side seal.

In a preferred embodiment, the battery elements are stacked to form a battery element stack in the order of the anode collector assembly, the anode, the separator, the cathode, and the cathode collector assembly. There may be additional elements present in the above order of stacking. In another preferred embodiment, the battery includes a plurality of adjacent battery element stacks. The design allows the battery stack elements to generate power passively, without pumps or blowers, in an efficiently packaged device.

In some embodiments, the anode current collector may include an electrically conductive perforated metal (including mesh), while in others, the cathode current collector may include an electrically conductive perforated metal (also including mesh). The cathode may include doped carbon nanofiber, and polytetrafluoroethylene (PTFE) or another hydrophobic material, helping make the cathode resistant to fluid inflow. The cathode, in various embodiments, is active for electrochemical oxygen reduction. To limit the negative effects of fuel crossover, the cathode is not an active catalyst for fuel oxidation.

In some embodiments, the case vents are reversibly occludable and may be opened and closed by a vent slider having slider fenestrations thus allowing a user to control air ingress to the battery interior volume. By closing the vents, the user can also slow the escape of fuel vapor from the battery reservoir.

In a preferred embodiment, the battery elements may be U-shaped. This configuration allows an improved air-fuel interface, thereby increasing the battery efficiency and allows the battery elements to be economically cut from sheet stock with maximum utilization of materials, thereby helping to control manufacturing costs.

Illustrative examples of various embodiments of the invention, all provided by way of example and not limitation, are described.

BRIEF DESCRIPTION OF THE ILLUSTRATIONS

Without limiting the scope of the liquid fuel battery as disclosed herein and referring now to the drawings and figures:

FIG. 11 shows I-V curves from the testing of a liquid fuel battery, as discussed in Example 2 below, having a plurality of cells, according to the instant invention These illustrations are provided to assist in the understanding of the exemplary embodiments of a liquid fuel battery design and method of forming the same as described in more detail below and should not be construed as unduly limiting the specification. In particular, the relative spacing, positioning, sizing and dimensions of the various elements illustrated in the drawings may not be drawn to scale and may have been exaggerated, reduced or otherwise modified for the purpose of improved clarity. Those of ordinary skill in the art will also appreciate that a range of alternative configurations have been omitted simply to improve the clarity and reduce the number of drawings.

DETAILED DESCRIPTION OF THE INVENTION

The liquid fuel/air battery, as illustrated well in FIGS. 1-9, contributes the favorable attributes of a direct methanol fuel cell, but has the ability to utilize high concentrations of liquid hydrocarbons as fuel, as well as the low cost and simplicity of construction of a primary metal-air battery. A basis of the technology is an air cathode that is not active for fuel oxidation. One example of an air cathode that is not active for fuel oxidation, but is active for oxygen reduction, is nitrogen-doped carbon. Not only can this material cost less to produce than platinum catalysts, but because of the insensitivity of the catalyst to fuel oxidation, a cell can be implemented without an expensive ion-conducting membrane. This becomes possible because there is no need to prevent the fuel from contacting the air cathode. Instead of expensive membranes that require complex manufacturing steps in assembling the cell, simple aqueous solutions can be used for the electrolyte, such as potassium hydroxide, sulfuric acid, or potassium chloride, among others. To minimize the space between the electrodes, a porous separator layer that is saturated with electrolyte can be used. The choice of the electrolyte will depend on the application the cell is being used for. With a basic electrolyte, such as potassium hydroxide (KOH), the cell may have the best initial performance, but can degrade because of carbon dioxide adsorption. The carbon dioxide is adsorbed from the atmosphere or from the product of the fuel oxidation. Acidic electrolytes would not be affected by adsorbed carbon dioxide, but cell performance is typically worse with acidic electrolytes because of slower oxygen reduction kinetics. Additionally, due to the corrosive nature of acids, long term operation of the cell may be limited unless higher cost componentry, such as machined graphite, is used for electrical current collection. Neutral electrolytes may have reduced initial cell performance, but would be less susceptible to component degradation, since neutral electrolytes would not be affected by $CO_2$ adsorption and would not degrade components. An added benefit of neutral electrolyte is that the solution is non-hazardous, so the cell could be safely recharged with electrolyte by untrained users. An additional benefit of using neutral or basic electrolytes is that additional options for anodes become possible. Most transition metals are not stable in acidic environments, so for a typical DMFC, precious metal anodes are used, such as platinum-ruthenium. In basic and neutral electrolytes, other options can be used, such as copper, gold, nickel, palladium, iron, cobalt, zinc, and mixtures thereof.

A number of options can be used as fuel for the liquid fuel/air battery of the present specifications. Aqueous methanol solutions are an excellent choice for many applications because methanol has a high energy density and completely oxidizes to a non-toxic carbon dioxide product. Similar to methanol solutions, formic acid solutions function well in neutral to acidic environments. Other alcohol solutions could also be employed in the disclosed invention, such as glycerol. Glycerol has three alcohol groups that can be readily oxidized at low temperatures, and since the carbon-carbon bond is not broken easily at low temperatures, carbon dioxide does not form, which can be a benefit for strong basic electrolyte configurations. Ethanol would have similar benefits to glycerol and have lower viscosity. Because of the high viscosity of glycerol, and the high volatility of methanol, mixtures of methanol and glycerol may be a good fuel for some applications. A number of other hydrocarbons, particularly those with alcohol, carboxyl, a formate species and/or soluble hydrides could be used as fuel. Sodium borohydride is an excellent fuel for some applications. Sodium borohydride is soluble and stable in basic solutions, and with some anode formulations can be electrochemically oxidized at a high potential.

In one embodiment, the fuel solution is mixed with electrolyte and contained in a reservoir that is in contact with the anode. The liquid fuel/air battery also includes an air cathode. This layer can consist of carbon cloth infiltrated with a catalyst for oxygen reduction, such as nitrogen-doped carbon. A key is that the catalyst is not active for fuel oxidation. The air cathode can be partially flooded with electrolyte, but may contain polytetrafluoroethylene (PTFE) (TEFLON®—E. I. du Pont de Nemours and Company). PTFE or another hydrophobic additive may be combined with an outer PTFE coating to prevent fuel and electrolyte from passing through the cathode layer completely. The layers are compressed together by a mechanical means and may utilize a series of seals and/or gaskets to seal the components. The geometries of the components in the stack could be designed to allow fuel/electrolyte to enter only the anode, electrical separator layers, and partially into the cathode layer; and air to enter only the cathode layers. The stack may consist of multiple repeat units, with each repeat unit containing the same set of components. The separator can be a porous material, such as porous polypropylene, that will absorb ionically conductive electrolyte. The separator could also be an ionically conductive membrane, such as a copolymer of tetrafluoroethylene (TEFLON®) and perfluoro-3,6-dioxa-4-methyl-7-octene-sulfonic acid (NAFION®—E. I. du Pont de Nemours and Company). The cathode is a porous conductive layer that contains an oxygen reduction catalyst, and preferably the catalyst is inactive for methanol oxidation. The cathode typically contains a material, such as PTFE, that makes it at least partially hydrophobic, thus preventing liquid from passing through it. Consequently, the cathode layer also acts as a seal to prevent fuel/electrolyte from leaking out of a series of stacked elements. Such a stack can be packaged and sealed within a fuel/electrolyte reservoir (except for an exposed air side) to form a small battery. This battery can have a number of additional design features, such as:

A sliding air inlet cover: an air inlet to the stack can be sealed by a sliding cover. This cover will prevent vaporized fuel and electrolyte from diffusing out of the stack when the unit is not in use. The sliding cover can be attached to a sliding switch. This same sliding switch can be connected to electrical connections that break the circuit for the device. This feature would make it impossible to pull current from the stack when the sliding cover is not open.

A refueling port: The fuel/electrolyte can contain one or more filler/drainage ports. This feature allows spent fuel to be drained from the reservoir into a secondary container, and fresh fuel/electrolyte to be charged into the system without exposing the user to the fuel/electrolyte solution.

A filtered air entrance: An air entrance can be covered by a filter and/or membrane. This membrane would prevent dust and/or carbon dioxide from entering the stack, and slow the diffusion of fuel and/or water from the stack. Ideally, the membrane would be selectively permeable to oxygen only.

A pH indicator: the fuel/electrolyte reservoir could include a port to allow the user to view the electrolyte. In this case, the electrolyte could contain a pH indicator that changes color if the electrolyte pH changes significantly, or any other pH measuring means (such as pH measuring devices) that would be known to one skilled in the art, indicating to the user that it is time to change the electrolyte.

A fuel density indication: as fuel is consumed, a ratio of fuel:water will decrease, and the density of the fuel/electrolyte will increase. This change in density can be indicated to the battery user with a float, or series of floats, inside the reservoir. A port could be included on the reservoir to view such a float feature. Alternatively, any density measuring means, such as density measuring devices, as would be known to one skilled in the art, could be employed.

A voltage regulator: the stack could be connected to a voltage regulator, ensuring that any device connected to the liquid fuel/air battery receives a constant voltage independent of current draw.

A USB connection: the stack could be further wired from the voltage regulator to a USB Port, allowing USB compatible devices to be charged with the liquid fuel/air battery.

Bio-fuel: The device could further be fueled with methanol, ethanol, glycerol and/or other alcohol derived from a $CO_2$-neutral source, such as biofeedstocks. This would enable the derived battery power to be $CO_2$ neutral, an advantage to users who want to reduce their carbon footprint.

Example 1

Figure 10:
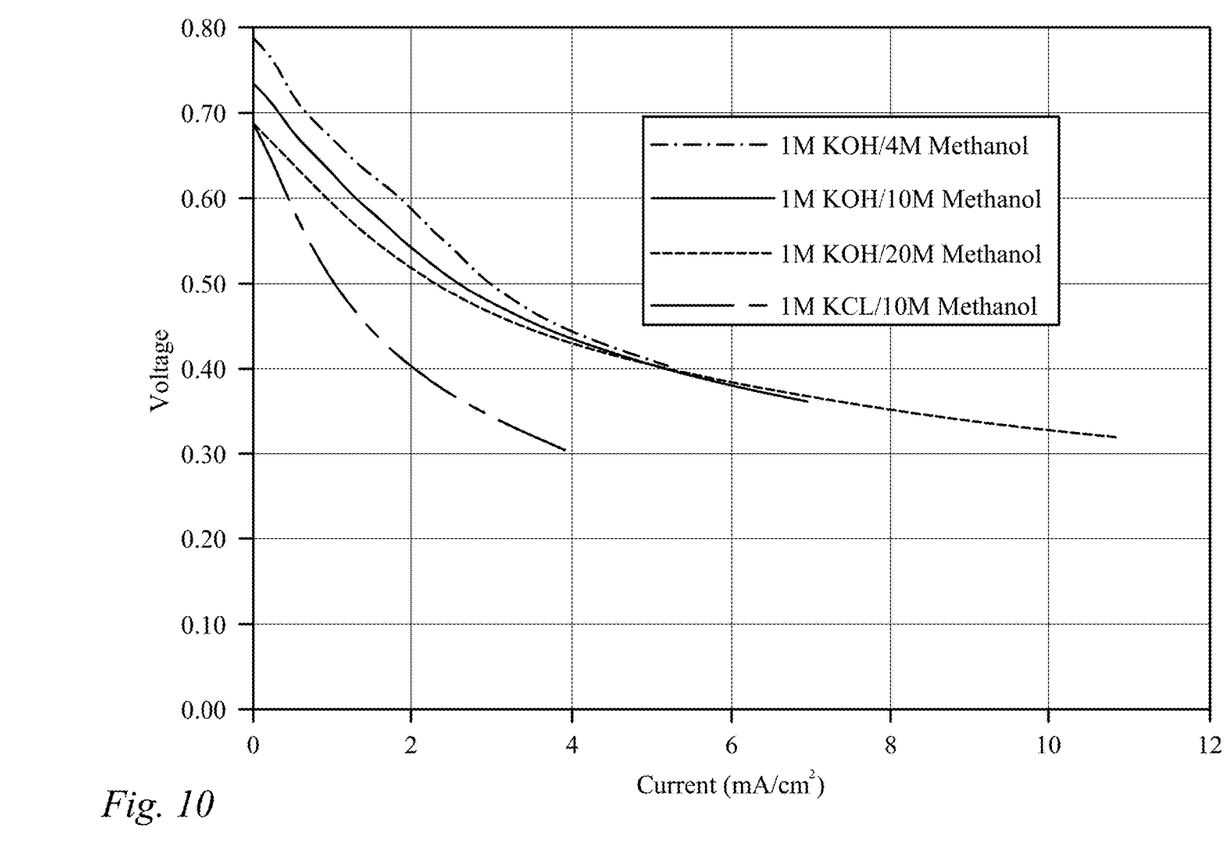
FIG. 10 shows I-V curves from the testing of a 9-$cm^2$ single cell liquid fuel battery, as discussed in Example 1 below, according to the instant invention with various electrolyte and fuel combinations.

Single cell versions of the invention have been demonstrated. To prepare a cell, nitrogen-doped carbon (CNx) nano-fibers were first prepared from acetonitrile pyrolysis in the presence of iron. This material does not show activity for methanol oxidation, but is active for oxygen reduction. To make the cathode layer, the fibers were mixed with 60% colloidal PTFE in water and denatured ethanol in a ratio of 110:18:12,000 CNx:PTFE solution:ethanol to form an ink. The ink was sonicated 30 minutes then applied with a paintbrush onto PTFE treated Toray Paper (TGP-H-120) until a loading of 5 mg/cm$^2$ was achieved. The electrode was dried underneath a heat lamp between coatings and after the final coat. To make the anode layer, 20% Pt/Ru on Vulcan Carbon (as received from The Fuel Cell Store) was mixed with 5% NAFION® in aliphatic alcohols (as received from Sigma Aldrich) and denatured ethanol in a ratio of 10:50:1600 catalyst:NAFION® solution:ethanol to form an ink. The ink was sonicated 30 minutes then applied with a paintbrush onto carbon paper until a loading of 5 mg/cm$^2$ was achieved. The electrode was dried underneath a lamp between coatings and after the final coat. The cell was formed by stacking from bottom to top a carbon paper current collection layer, the anode, a Celgard 5550 battery separator, the cathode, and a NAFION®-treated carbon paper current collection layer The cell was placed in a fixture for testing and the reservoir was loaded with various electrolyte/fuel combinations. I-V curves were obtained using a potentiostat. The performance obtained from cells with varying electrolytes and concentrations of methanol fuel are shown in FIG. 10. Significant current can be drawn from the cell at voltages above 0.3 V.

Example 2

A stack of 2 cells in series, stacked vertically, was constructed to demonstrate the invention. For this stack, the following components were used in each cell, and stacked in the order given:

Interconnects or end plates were made of stainless steel 316 foil, 620 microns thick. The interconnects were cut into rectangles with dimensions of 107 mm by 51.5 mm. The end plates replaced the interconnects on the top and bottom of the stack. The endplates were identical to the interconnects except for an additional tab used to connect lead wires with alligator clips for electrical measurements.

Anode side seals were made of soft (30 A durometer) silicone gaskets with a thickness of 0.83 mm. The seals were cut to seal off three sides of the anode with one open side (the fuel side), and to have outer dimensions of 107 mm by 51.5 mm. The open area inside the seal had dimensions of 81.5 mm by 36.5 mm.

Anode current collectors were made of stainless steel 316 woven mesh. The 24×24 size (wires per inch) mesh is made of 0.355 mm wire with 0.711 mm openings. The mesh provides contact between the interconnect/endplate and the anode, and allows fuel to diffuse into the anode and reaction products to diffuse out. The mesh had dimensions of 81 mm by 36 mm, thus filling the open area inside the seal perimeter. The thickness of the mesh was 0.65 mm, just smaller than the seals. Under compression, the seal thickness was reduced until electrical contact was made between the interconnect/end plates and the anode.

The anode layer, was composed of thin (165 micron) carbon fiber cloth infiltrated with a catalyst and binder. In this example, the catalyst was a finely dispersed palladium-nickel alloy (nominally 6-wt-% and 11 wt-%, respectively) supported on carbon black. NAFION® ionomer, with a dry loading of 6-wt % was used as a binder. The dimensions of the anode were 81 mm by 36 mm, and the anode was placed in the open area of the seal.

A separator layer was made of a porous polypropylene film. The film is 25 microns thick, and has dimensions of 93 mm by 44.5 mm.

A cathode Gas Diffusion Electrode (GDE), was composed of porous carbon fiber paper that was 360 microns thick. The paper was first infiltrated with 40-wt % PTFE to prevent the passage of liquid through the layer, effectively making the cathode GDE a liquid seal. The cathode GDE retained sufficient porosity to allow oxygen to permeate the cathode layer. On the side of the cathode GDE that was placed against the separator, a catalyst layer was printed. The catalyst layer contained a mixture of oxygen reduction catalyst (nominally 80 wt-%) and PTFE (nominally 20-wt %). The oxygen reduction catalyst is preferably not active for fuel oxidation, but is active for oxygen reduction, such as nitrogen-doped carbon nano-fibers, which were used in this case. The total loading of catalyst is 4 mg/cm$^2$. The dimensions of the cathode GDE were 100 mm by 50 mm.

Cathode side seals were made of soft (30 A durometer) silicon gaskets with a thickness of 0.83 mm. The seals were cut to seal off three sides of the cathode with one open side (the air side), and to have outer dimensions of 107 by 51.5 mm. The open area inside the seal had dimensions of 81.5 mm by 36.5 mm.

Figure 11:
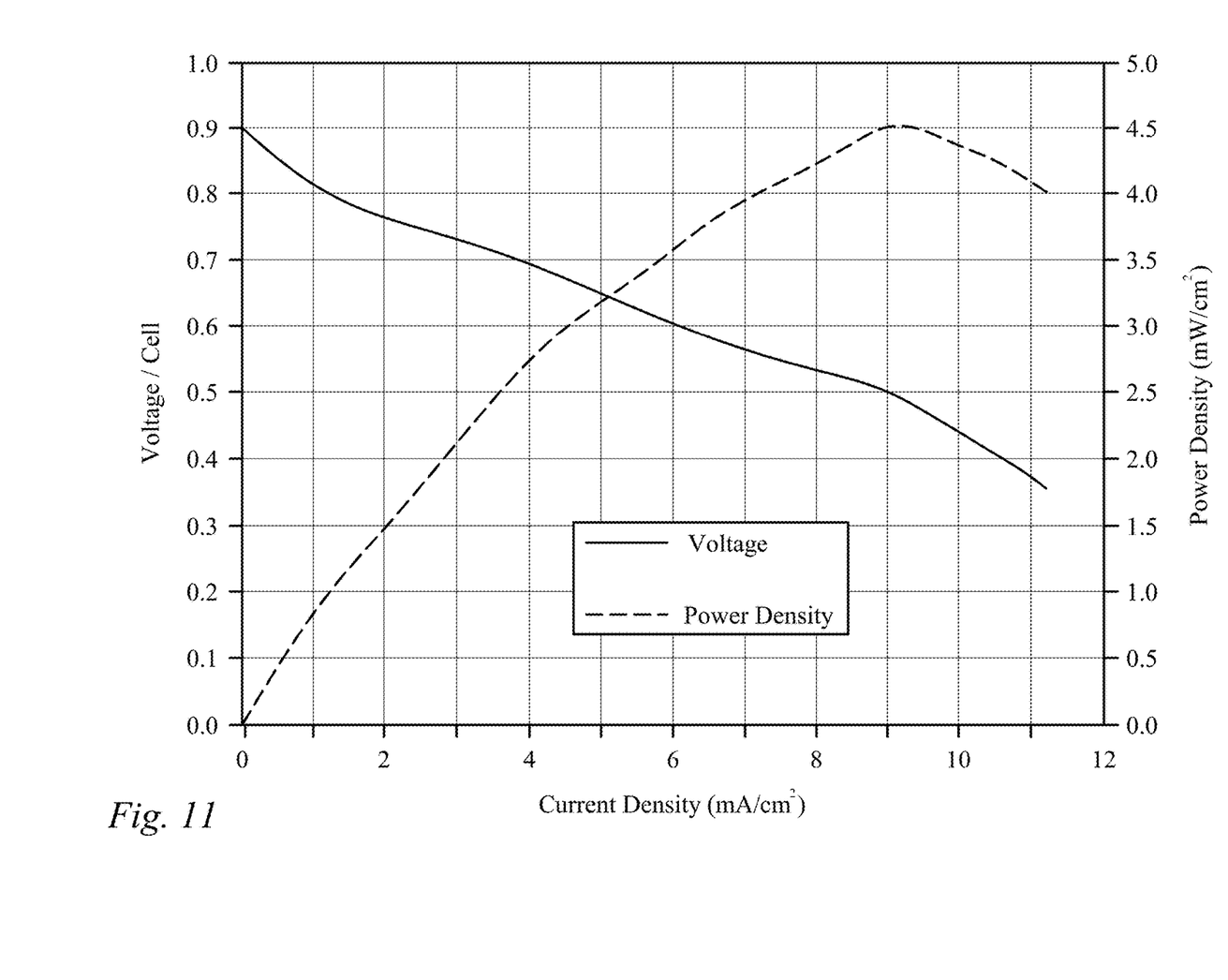

Cathode current collectors were made of stainless steel 316 woven mesh. The 24×24 mesh is made of 0.355 mm wire with 0.711 mm openings. The mesh provides contact between the interconnect/endplate and the cathode, and allows air to diffuse into the cathode. The mesh had dimensions of 81 mm by 36 mm, thus filling the open area inside the seal perimeter. The thickness of the cathode mesh is 0.65 mm, just smaller than the seals. Under compression, the seal thickness was reduced until electrical contact was made between the interconnect/end plates and the cathode. A 3-cell stack was assembled layer by layer and compressed between 6.35 mm thick acrylic plates. The fuel side of the stack was sealed to a fuel reservoir, while the air side of the stack was left open to the atmosphere. The fuel reservoir was filled with an aqueous mixture of 0.5 M NaBH$_4$ in 2 M KOH. The top and bottom of the stack was connected to a potentiostat with a power booster to measure current draw from the stack as a function of voltage. The voltage of the stack was swept from open circuit potential to a voltage 1.0 V lower than OCV at a rate of 10 mV/s. FIG. 11 shows the current density (normalized to the anode area of a single cell) produced by the stack as a function of voltage. Higher than 10 mA/cm$^2$ can be produced in this stack configuration at 0.4 V/cell without mass transfer limitations causing a rapid drop in power output. The maximum overall power density of the stack is approximately 4.5 W/cm$^2$. Considering the low precious metal loading of the electrodes and the other inexpensive components in this stack, one can envision that a cost-effective device based on this technology could be realized.

TABLE 1

Stack current versus voltage curve (seen as FIG. 11)

| V/Cell | Current (mA/cm$^2$) | mW/cm2 |
|---|---|---|
| 0.9 | 0 | 0 |
| 0.80 | 1.11 | 0.89 |
| 0.70 | 3.87 | 2.71 |
| 0.58 | 6.60 | 3.83 |
| 0.50 | 9.09 | 4.55 |
| 0.40 | 10.57 | 4.24 |
| 0.36 | 11.19 | 4.01 |

Various important design trade-offs may affect performance of the stack technology, and optimal choice of these parameters depends on the application the stack technology is employed for, as would be obvious to one skilled in the art.

For example there are considerations in wire mesh geometry with the use of such mesh. Thin wire mesh is helpful to make the cells as thin as possible, an important attribute for a packaged device based on the core stack technology. However, thicker mesh or a conductive plate with channels will allow air or fuel to diffuse more easily into the cathode or anode respectively. Consequently, an optimization of these trade-offs for a specific application operating conditions will exist. Additionally, mesh or channels with larger open area will allow air or fuel to diffuse more easily. However, meshes or channels with larger open area will have poorer electrical contact, therefore, requiring optimization of these parameters as well.

As to cell width; the width of the cells determines how far fuel and air must diffuse to reach all of the cell active area. Less wide cells can therefore achieve higher current density. However, less wide cells will require the cells to be longer to achieve a specific area, and will have a higher ratio of edge length to active area, resulting in more seal and interconnect material.

There are various considerations to anode catalysts, and these are contemplated as a part of this specification. For oxidation of sodium borohydride, Pd—Ni alloys perform well. However, the disclosed stack can operate on other fuels, such as methanol or ethanol depending on the anode used.

As to separator materials; for fuels mixed with electrolyte, such as sodium borohydride mixed with potassium hydroxide, a porous separator functions well between the cathode and anode. However, an ion conducting membrane could be employed to eliminate the need to add electrolyte to the fuel. For example, a proton-conducting NAFION® membrane could be used to operate with fuels that are electrochemically oxidized in acidic environments. A hydroxide-conducting membrane could be used to operate with fuels that are electrochemically oxidized in basic environments.

Finally, as to size and number of cells, it is clear that stacking multiple cells will increase the overall voltage of the stack, and reduce the cell area footprint. A trade-off with more cells will be a thicker stack, and more repeat units to assemble.

What is claimed then, and as seen well in FIGS. 1-9, are various embodiments of a liquid fuel battery (10). The battery (10) may include a case (100) having at least one wall (102) defining an interior volume (120), as seen well in FIGS. 1-4. The case may be sealed, or may have a removable case top (300) closure, seen in FIG. 1, which when present, for the purposes of this specification, will be considered a part of the wall (102) of the case (100). Again with reference to FIGS. 1-4, the case (100) may have reversibly closeable vents (104) in the wall (102) that are capable of placing at least a portion of the interior volume (120) in reversible fluid communication with an external atmosphere. These vents (104) serve as ingress points for air for the battery (10) function.

The case may have a refillable fuel chamber (130), seen well in FIGS. 1-4, and at least one fuel port (132) at least partially within the interior volume (120) of the case (100). The fluid chamber (130) will be in fluid communication with at least one of a plurality of substantially planar vertically stacked battery elements (400), seen well in the aggregate in FIGS. 1-4, and more particularly in FIGS. 5-9. Each battery element may have, as seen well in FIG. 5, at least one peripheral edge (402) having a fuel-side section (404) and an air-side section (406).

The battery elements (400), seen well in FIGS. 6-9, include at least an anode collector assembly (420) having a anode current collector (422) in fluid communication with the fuel chamber (130) on the fuel-side section (404) and sealed from an ambient atmosphere on the air-side section (406) by an anodic air-side seal (424). The battery elements also include an anode (430) in fluid communication with the fuel chamber (130) on the fuel-side section (404) and sealed from an ambient atmosphere on the air-side section (406) by an anodic air-side seal (424). An electrically nonconductive separator (440) separates the anode (430) and the cathode (450). A porous to air cathode (450) is in fluid communication with an ambient atmosphere on the air-side section (406) and a cathode collector assembly (460) has a cathode current collector (462) in fluid communication with an ambient atmosphere on the air-side section (406) and sealed from the fuel chamber (130) on the fuel-side section (404) by a cathodic fuel-side seal (464).

Figure 7:
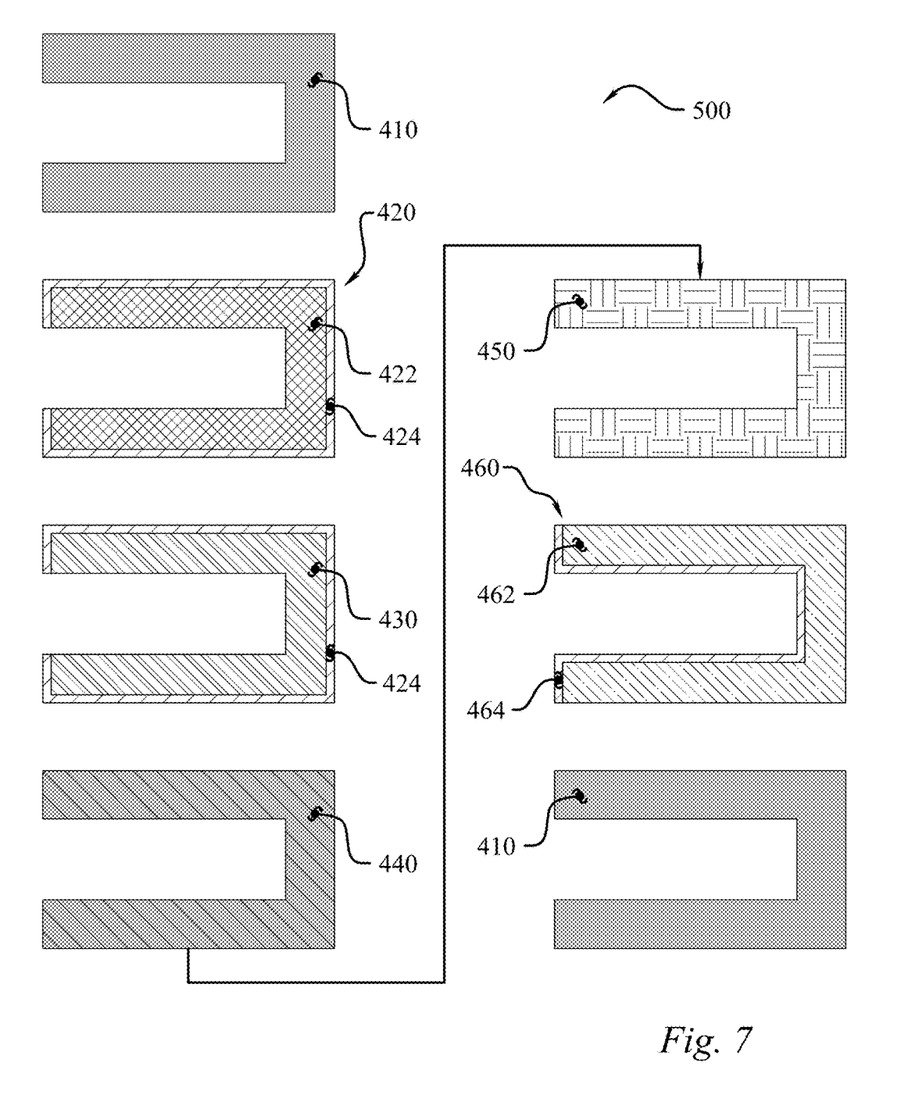
FIG. 7 shows an exploded top plan view of a stack of battery elements in the order in which they are stacked in an embodiment of the battery.
Figure 8:
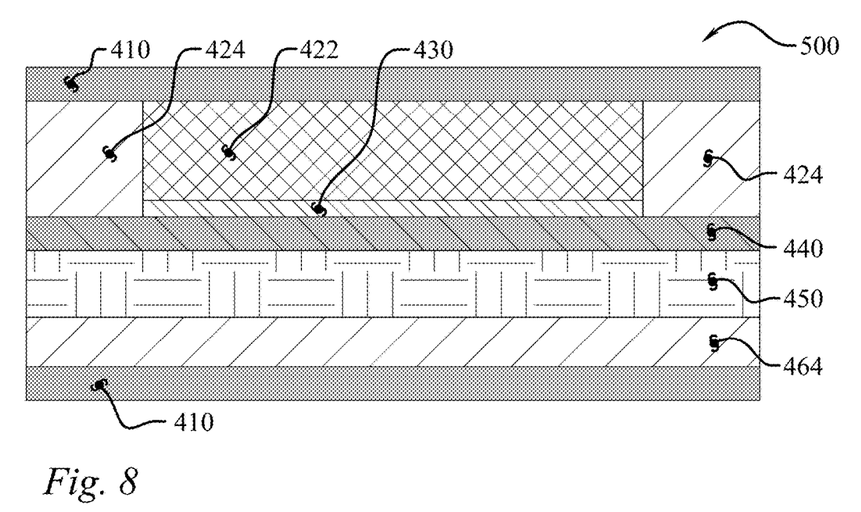
FIG. 8 shows a side sectional view of a battery stack viewed from a fuel-side of an embodiment of a liquid fuel battery.
Figure 9:
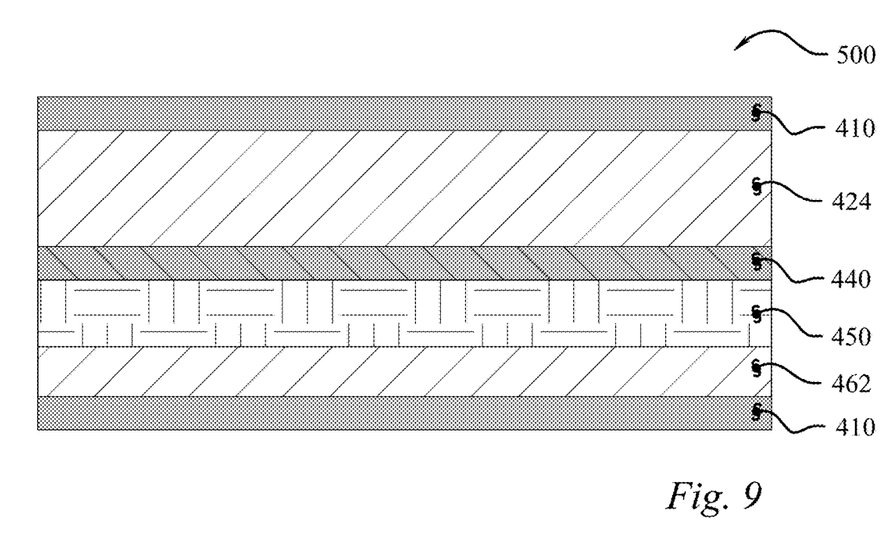
FIG. 9 shows a side sectional view of a battery stack viewed from an air-side of an embodiment of a liquid fuel battery.

In a preferred embodiment, seen well in FIG. 7, the battery elements (400) are stacked to form a battery element stack (500) in the order of the anode collector assembly (420), the anode (430), the separator (440), the cathode (450), and the cathode collector assembly (460). There may be additional elements present in the above order of stacking.

In another preferred embodiment, seen in FIGS. 1-4, the battery includes a plurality of adjacent battery element stacks (500) each separated from an adjacent battery element stack (500) by a non-porous electrically conductive interconnect (410) electrically connected with each battery element stack (500). Such a battery stack (500) serves to increase the electrical generating capacity of the battery (10).

In some embodiments, the anode current collector (422) may include an electrically conductive mesh or plate with channels while in others, the cathode current collector (462) may include an electrically conductive mesh or plate with channels. In certain embodiments, the cathode (450) may include doped carbon nanofiber, while in others, the cathode (450) may include polytetrafluoroethylene (PTFE) or another hydrophobic material. The PTFE may be infiltrated into the cathode (450), may be supplied as a coating on the cathode (450), or otherwise applied as would be known to one skilled in the art. Among other advantages, the PTFE or other hydrophobic material tends to make the cathode (450) resistant to fluid inflow. The cathode (450), in various embodiments, is active for oxygen reduction and not active for fuel oxidation.

A wide variety of liquid fuels may be utilized in the battery (10), and these fuels would be well-known to one skilled in the art. These fuels can include an alcohol, a carboxyl species, a formate species, soluble hydrides and mixtures thereof. In some embodiments, the alcohol may include glycerol, ethanol, methanol and mixtures thereof.

In various embodiments, either or both the anode current collector (422) and the cathode current collector (462) may include a perforated metal, and for the purposes of this specification, the term "perforated metal" may include any of the various gauges of metal mesh.

In some embodiments, seen well in FIGS. 1-4, the case vents (104) are reversibly occludable may be opened and closed by a vent slider (200) having slider fenestrations (220). Such an arrangements allows the user to control air ingress to the battery (10) interior volume (120). Additionally, closing the vents (104) will help prevent fuel evaporation during periods of non-use and help decrease electrolyte carbonation see with the use of basic electrolytes. Additionally, the vent slider (200) may be configured to act as an on/off switch for the battery, preventing current from being drawn from the battery when the vents (104) are closed. Within the battery (10), the wherein the fuel chamber (130) further comprises a densitometer and/or a pH indicator, so that a user may monitor the state of the liquid fuel and may be guided as to the need of replenishing or replacing the same.

In a preferred embodiment, at least one of the battery elements (400) such as the anode collector assembly (420), the anode (430), the cathode (450), and the cathode collector assembly (460) may be U-shaped. In other preferred embodiments, seen well in FIGS. 1-4, all of the battery elements (400) such as the anode collector assembly (420), the anode (430), the cathode (450), and the cathode collector assembly (460) are U-shaped. This configuration allows an improved air-fuel interface, thereby increasing the battery (10) efficiency. The U-shape also allows the battery elements (400) to remain in communication with a liquid fuel regardless of device orientation, which is particularly important when the fuel chamber (130) is not completely filled with fuel. Additionally, a U-shaped configuration allows the battery elements (400) to be cut from sheet stock with maximum utilization of materials, thereby helping to control manufacturing costs.

Figure 1:
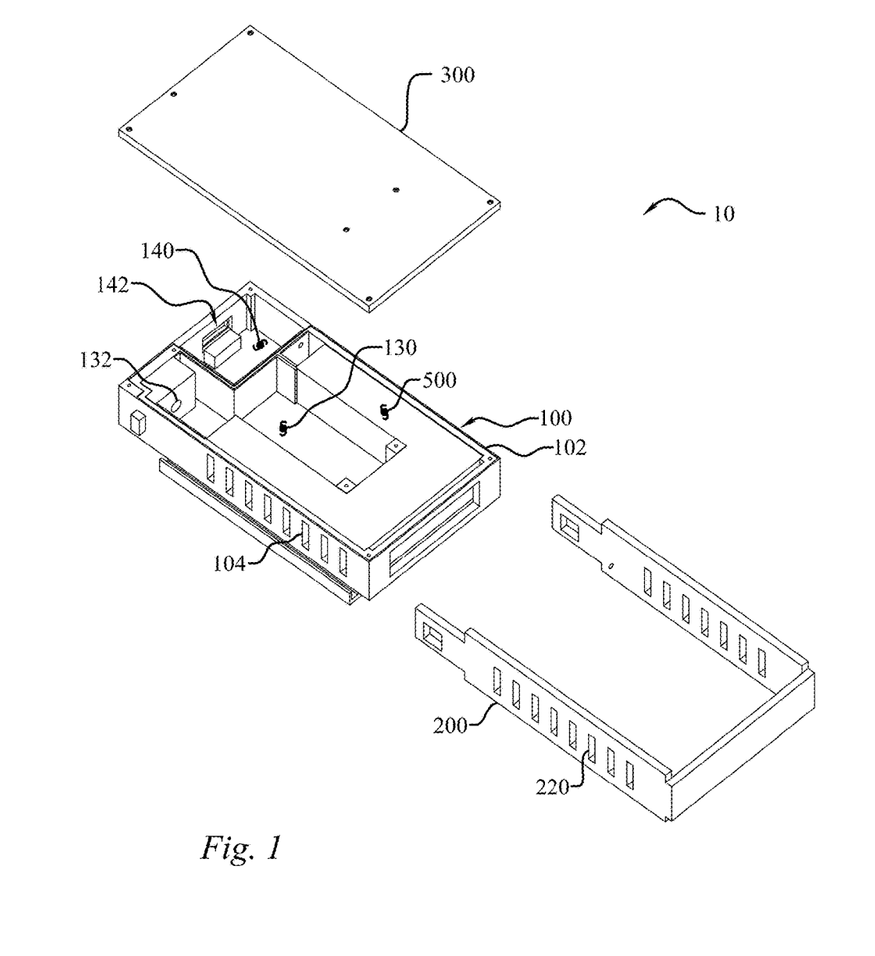
FIG. 1 shows an exploded perspective view of an embodiment of a liquid fuel battery.
Figure 2:
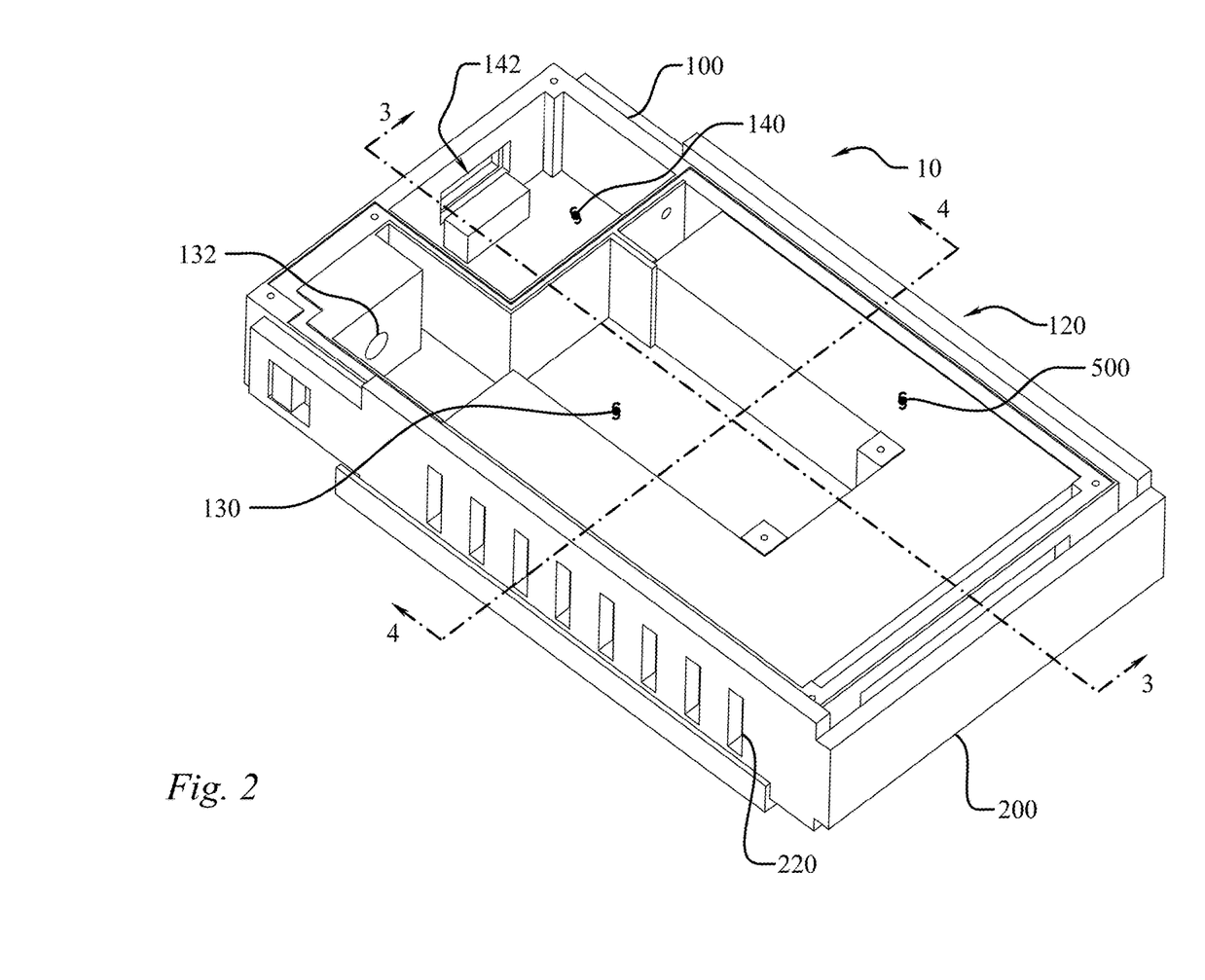
FIG. 2 shows a detailed perspective view of the battery of FIG. 1.
Figure 3:
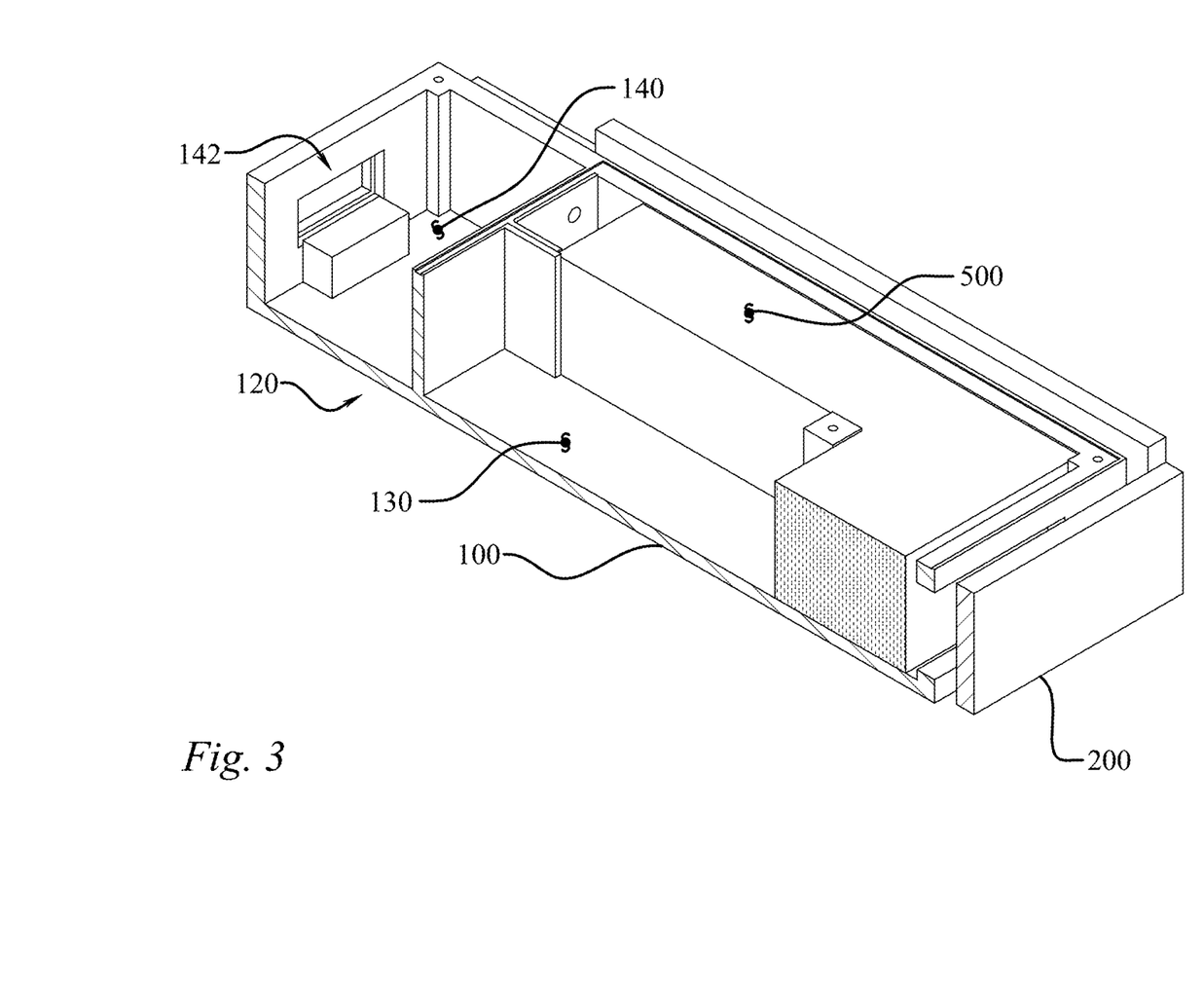
FIG. 3 shows a sectional view taken along line 3-3 of FIG. 2.
Figure 4:
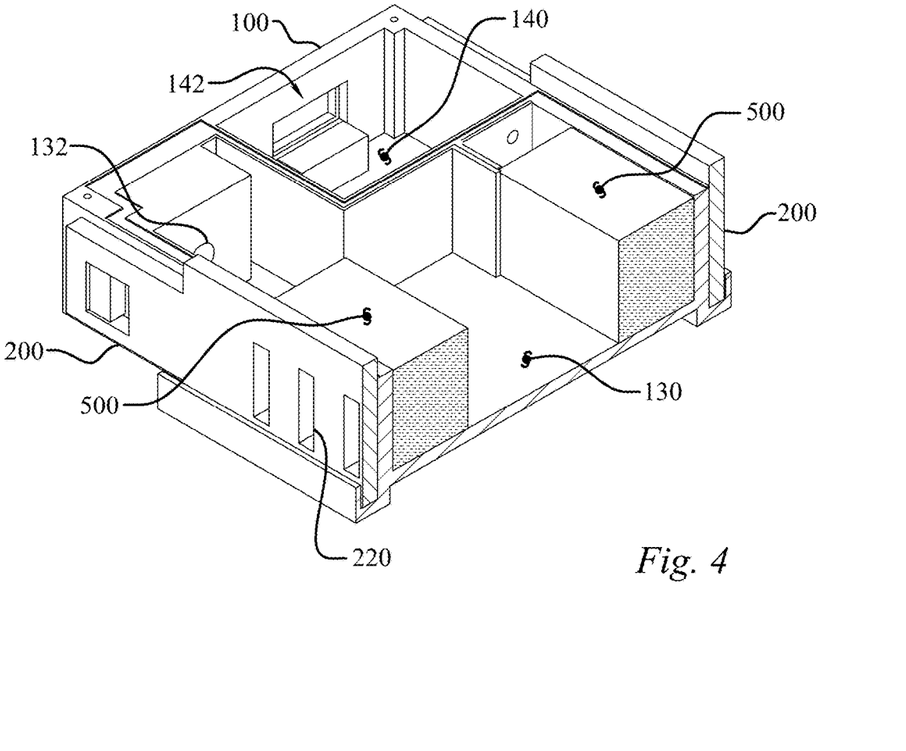
FIG. 4 shows a sectional view taken along line 4-4 of FIG. 2.
Figure 5:
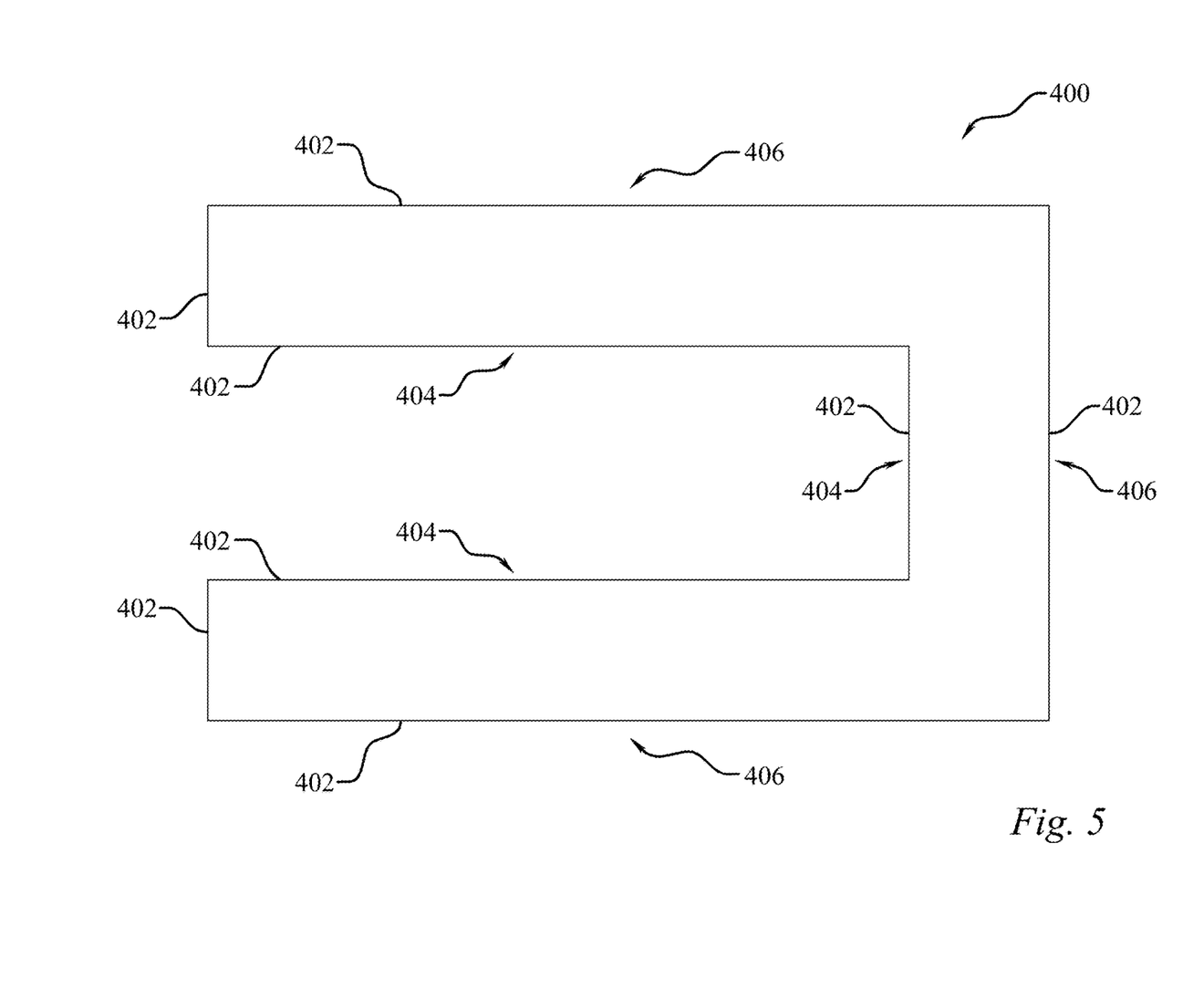
FIG. 5 shows a top plan view of an embodiment of a battery element.
Figure 6A:
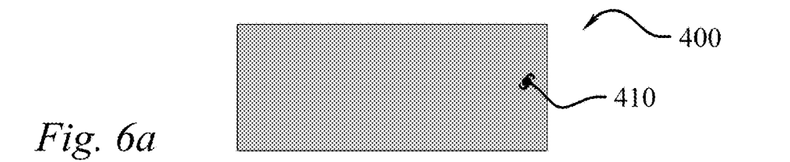
FIGS. 6a-6g show a top plan view of a series of battery elements.
Figure 6B:
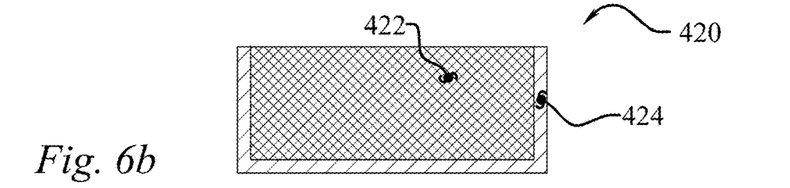
Figure 6C:
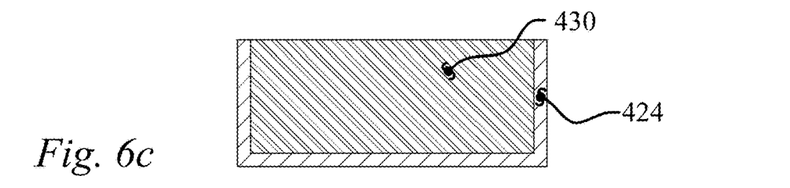
Figure 6D:
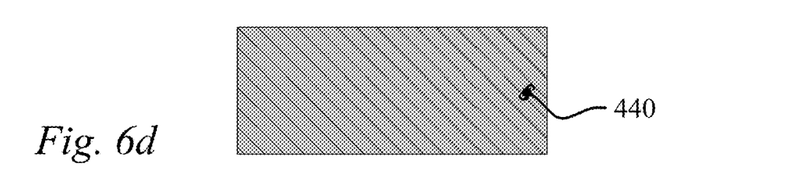
Figure 6E:
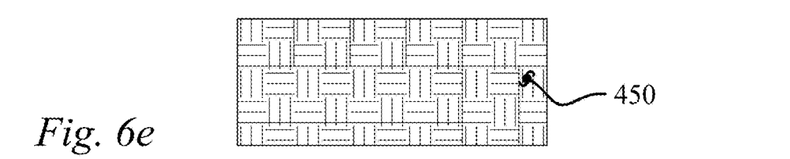
Figure 6F:
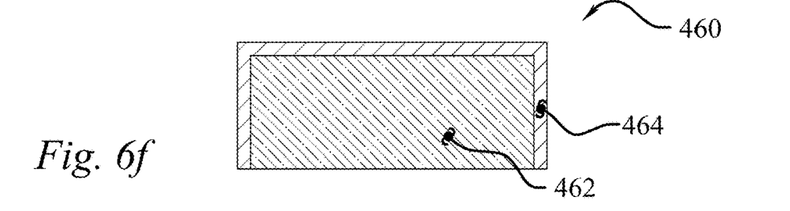
Figure 6G:
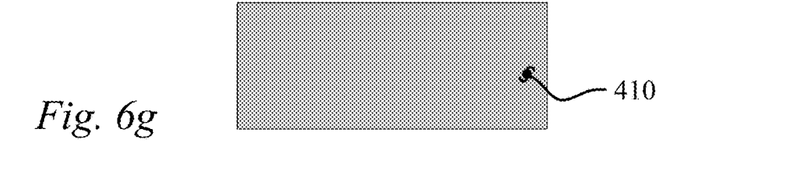

The battery (10) may interface electrically with the outside environment in any number of ways, all of which would be known to one skilled in the art. The battery (10) inner volume (120) may include an electrical compartment (140) having various electrical devices and connections, one of which may be, as seen in FIGS. 1, 2, and 4, at least one universal serial bus (USB port) (142) in electrical continuity with the battery stack (500), thereby allowing other outside electrical devices to be attached to the battery (10).

We claim:

1. A liquid fuel battery (10) comprising:
   a case (100) having at least one wall (102) defining an interior volume (120), and reversibly closable vents (104) in the wall (102) placing at least a portion of the interior volume (120) in reversible fluid communication with an external atmosphere;
   a refillable fuel chamber (130) and a fuel port (132) further comprising a combined fuel filling port and reaction product removal port, at least partially within the interior volume (120) in fluid communication with at least one of a plurality of substantially planar vertically stacked battery elements (400) having at least one peripheral edge (402) having a fuel-side section (404) and an air-side section (406);
   the battery elements (400) comprising at least an anode collector assembly (420) having a anode current collector (422) in fluid communication with the fuel chamber (130) on the fuel-side section (404) and sealed from an ambient atmosphere on the air-side section (406) by an anodic air-side seal (424), an anode (430) in fluid communication with the fuel chamber (130) on the fuel-side section (404) and sealed from an ambient atmosphere on the air-side section (406) by the anodic air-side seal (424), an electrically nonconductive separator (440), a cathode (450) porous to air in fluid communication with an ambient atmosphere on the air-side section (406) and a cathode collector assembly (460) having a cathode current collector (462) in fluid communication with an ambient atmosphere on the air-side section (406) and sealed from the fuel chamber (130) on the fuel-side section (404) by a cathodic fuel-side seal (464); and wherein all reaction products are stored in a common volume with liquid fuel in the refillable fuel chamber (130).

2. The device according to claim 1, wherein the battery elements (400) are stacked to form a battery element stack (500) in the order of the anode collector assembly (420), the anode (430), the separator (440), the cathode (450), and the cathode collector assembly (460).

3. The device according to claim 2, wherein the battery (10) comprises a plurality of adjacent battery element stacks (500) each separated from an adjacent battery element stack (500) by a non-porous electrically conductive interconnect (410) electrically connected with each battery element stack (500).

4. The device according to claim 1, wherein a collector selected from the group of collectors consisting of the anode current collector (422) and the cathode current collector (462) further includes an electrically conductive mesh-.

5. The device according to claim 1, wherein the cathode (450) comprises doped carbon nanofiber.

6. The device according to claim 5, wherein the cathode (450) comprises polytetrafluoroethylene.

7. The device according to claim 1, wherein the cathode (450) is active for oxygen reduction and not active for fuel oxidation.

8. The device according to claim 1, wherein the fuel chamber (130) comprises a fuel selected from the group of fuels consisting of an alcohol, a carboxyl species, a formate species, soluble hydrides and mixtures thereof.

9. The device according to claim 8, wherein the alcohol is selected from the group of alcohols consisting of glycerol, ethanol, methanol and mixtures thereof.

10. The device according to claim 1, wherein at least one of the collectors selected from the group of collectors consisting of the anode current collector (422) and the cathode current collector (462) comprises a perforated metal.

11. The device according to claim 1, wherein at least one of the collectors selected from the group of collectors consisting of the anode current collector (422) and the cathode current collector (462) comprises a metal plate having channels.

12. The device according to claim 1, wherein the case vents (104) are reversibly occludable by a vent slider (200) having slider fenestrations (220).

13. The device according to claim 1, wherein the fuel chamber (130) further comprises a densitometer.

14. The device according to claim 1, wherein at least one of the battery elements (400) consisting of the anode collector assembly (420), the anode (430), the cathode (450), and the cathode collector assembly (460) are U-shaped.

15. The device according to claim 1, wherein the refillable fuel chamber (130) is filled with a liquid fuel consisting of ethanol.

* * * * *